July 9, 1940.  F. A. ARBOGAST  2,207,425

ARTIFICIAL FISH BAIT

Filed Dec. 17, 1938

INVENTOR
FRED A. ARBOGAST

BY

*Ralph Barrow*

ATTORNEY

Patented July 9, 1940

2,207,425

UNITED STATES PATENT OFFICE 2,207,425

ARTIFICIAL FISH BAIT

Fred A. Arbogast, Akron, Ohio

Application December 17, 1938, Serial No. 246,414

7 Claims. (Cl. 43—46)

This invention relates to artificial fish bait.

The general object of the invention is to provide an artificial fish bait which, when retrieved by drawing it through the water, will simulate the action of live bait by end to end wobbling and oscillatory rolling about its longitudinal axis, at the same time producing a gurgling or bubbling noise in the water, thereby to attract fish.

Other objects of the invention will be manifest from the following brief description and the accompanying drawing.

Figure 3:
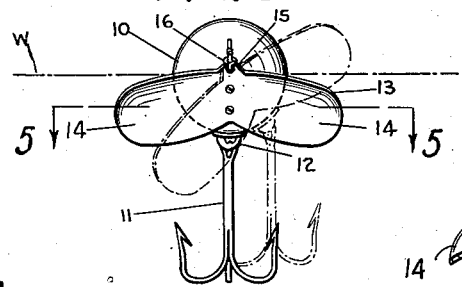
Figure 3 is a front view of the bait, as viewed from the left of Figure 1.

Referring to the drawing, the bait may comprise a body 10, of substantially ovate shape and which may be of such buoyancy that it will normally float partly submerged beneath the surface of the water, as indicated by the waterline W in Figure 3, or will move along the surface of the water when retrieved. The usual hooks 11, 11 may be swivelly connected, or otherwise connected, to clips 12, 12 secured to underside, or any other suitable part of body 10, in any suitable manner.

Figure 1:
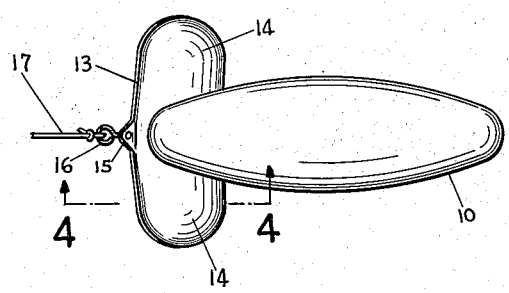
Figure 1 is a top plan view of the improved artificial fish bait embodying the invention.
Figure 2:
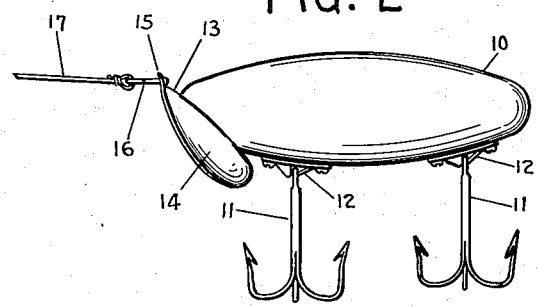
Figure 2 is a side elevation thereof.
Figure 5:
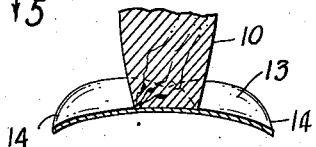
Figure 5 is a fragmentary cross-section taken substantially on line 5—5 of Figure 3.
Figure 4:
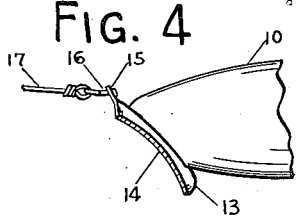
Figure 4 is a cross-section taken on line 4—4 of Figure 1.

Secured to the forward end of body 10, there is a concavo-convex plate 13, preferably extending substantially below the axis of the bait or body 10 and extending downwardly and rearwardly at a substantial oblique angle to the longitudinal axis of body 10, substantially as shown in Figure 2, the convex surface being against the front end of the body 10. Plate 13 extends laterally outwardly of body 10 to provide spoon-shaped portions 14, 14, the outer edges of which extend forwardly of the bait body, as best shown in Figure 5. An upwardly extending lug may be provided on plate 13 for receiving a swivel connection 16, to which may be attached the usual fishing line 17. This connection is preferably made at the top of the bait, as shown.

Upon retrieving the bait through the water in the usual manner, the concavity on the underside of plate 13 causes body 10 to wobble from end to end at the same time the shape and inclination of plate 13, and the extending portions 14 as the bait travels through the water, is effective alternately to lift the projecting portions 14, somewhat as indicated in chain-dotted lines in Figure 3. This causes the body 10 to roll on its longitudinal axis as it wobbles effectively to expose sides of the bait to the vision of a fish; due to this rolling action, the projecting, cup-shaped portions 14 of plate 13, alternately move upwardly of the surface of the water, disturbing the surface and creating by reason of the substantial pockets between extensions 14 and the bait body a rhythmic, gurgling or bubbling sound. The life-like animation of the bait, and the rolling exposure of its sides, combined with the disturbance of the water and rythmic, gurgling sound, is very attractive to fish life.

Modifications of the invention may be resorted to without departing from the spirit thereof or the scope of the appended claims.

What is claimed is:

1. An artificial bait comprising a surface bait body, and a concavo-convex member on said body at its front end and extending laterally from opposite sides thereof, said member extending downwardly and rearwardly at a substantial oblique angle to the longitudinal axis of said body, the concave face of said member being forwardly of the bait, the forward portion of the bait and the convex side of said member providing a substantial pocket, thereby producing a rhythmic gurgling as the bait travels on the water, said bait body having one or more hooks thereon rearwardly of the front end thereof.

2. An artificial bait comprising a surface bait body, said body having a concave member thereon at its front end, and provided with laterally extending portions, the forward face of said member extending downwardly and rearwardly at a substantial oblique angle to the longitudinal axis of said body, the forward face of said member being concave and the exposed upper and rear surfaces of said extended portions being convex, the medial portion of the lower edge of the plate being substantially in the same plane as the bottom surface of the bait, said bait body having one or more hooks thereon rearwardly of the front end thereof.

3. An artificial bait comprising a surface bait body, said body having a concave plate secured at its front end and provided with laterally extending portions along a major axis transversely of the longitudinal axis of the bait body, said major axis of the plate being substantially parallel to the surface of the water on which the bait is moved, the forward face of said member extending downwardly and rearwardly at an oblique angle to the longitudinal axis of said body, said forward face of said member being concave, said bait body having one or more hooks thereon rearwardly of the front end thereof.

4. An artificial bait comprising a surface bait body having secured thereto at its front end a concave plate extending downwardly and rearwardly at a substantial oblique angle to the longitudinal axis of said body, with the concave face of said plate forwardly of the bait, said plate having portions extending laterally from the sides of said bait body, substantially every portion of the surface of the bait adjacent to the rear of the plate forming therewith walls of pockets, said bait body having one or more hooks thereon rearwardly of the front end thereof.

5. An artificial bait comprising a surface bait body having secured thereto at its front end a concave plate extending downwardly and rearwardly at a substantial oblique angle to the longitudinal axis of said body, with the concave face of said plate forwardly of the bait, said plate having portions extending laterally from the sides of said bait body, the minor axis of the plate having one terminal at the bottom of the bait and the other terminal substantially at the top of the bait, the upper terminal constituting securing means for the line, said bait body having one or more hooks thereon rearwardly of the front end thereof.

6. An artificial bait comprising a surface bait body having secured thereto at its front end a concave plate extending downwardly and rearwardly at a substantial oblique angle to the longitudinal axis of said body, with the concave face of said plate forwardly of the bait, said plate having portions extending laterally from the sides of said bait body, an imaginary line connecting extreme points in the major axis of the plate being forwardly of an imaginary line connecting extreme points of the minor axis, said major axis of the plate being substantially parallel to the surface of the water on which the bait is moved, said bait body having one or more hooks thereon rearwardly of the front end thereof.

7. An artificial bait comprising a surface bait body having secured thereto at its front end a concave plate extending downwardly and rearwardly at a substantial oblique angle to the longitudinal axis of said body, with the concave face of said plate forwardly of the bait, said plate having portions extending laterally from the sides of said bait body, and means providing the point of connection of the line to the plate in advance of the lower extremity of the minor axis of the plate, said minor axis being in a plane substantially normal to the surface of the water on which the bait is moved, said bait body having one or more hooks thereon rearwardly of the front end thereof.

FRED A. ARBOGAST.